Jan. 14, 1930.  J. R. CRAWFORD  1,743,882
TWO-DEPTH COTTON PLANTER
Filed April 28, 1927  3 Sheets-Sheet 1
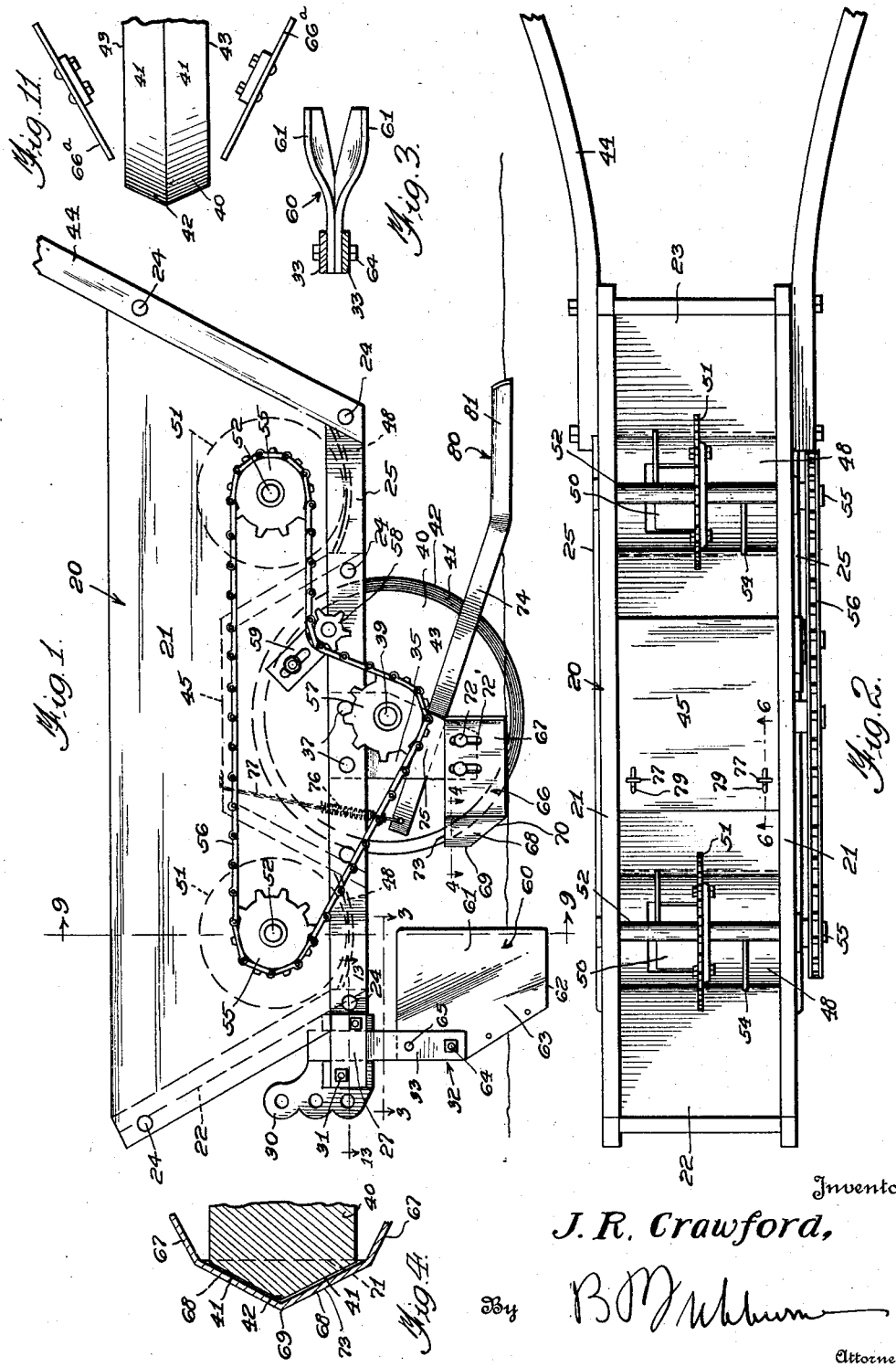
Inventor
J. R. Crawford,
By
Attorney

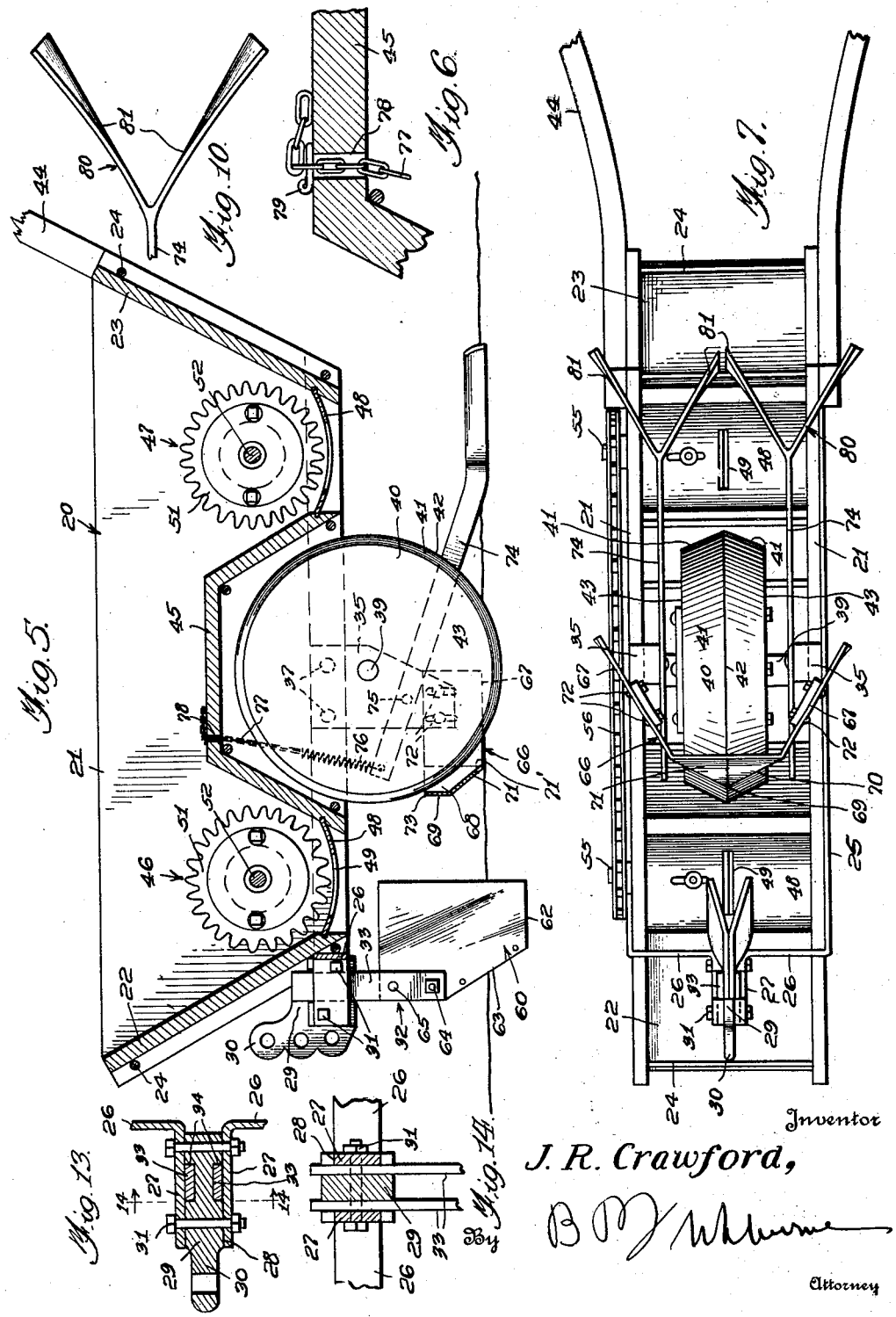

Jan. 14, 1930.   J. R. CRAWFORD   1,743,882
TWO-DEPTH COTTON PLANTER
Filed April 28, 1927   3 Sheets-Sheet 3
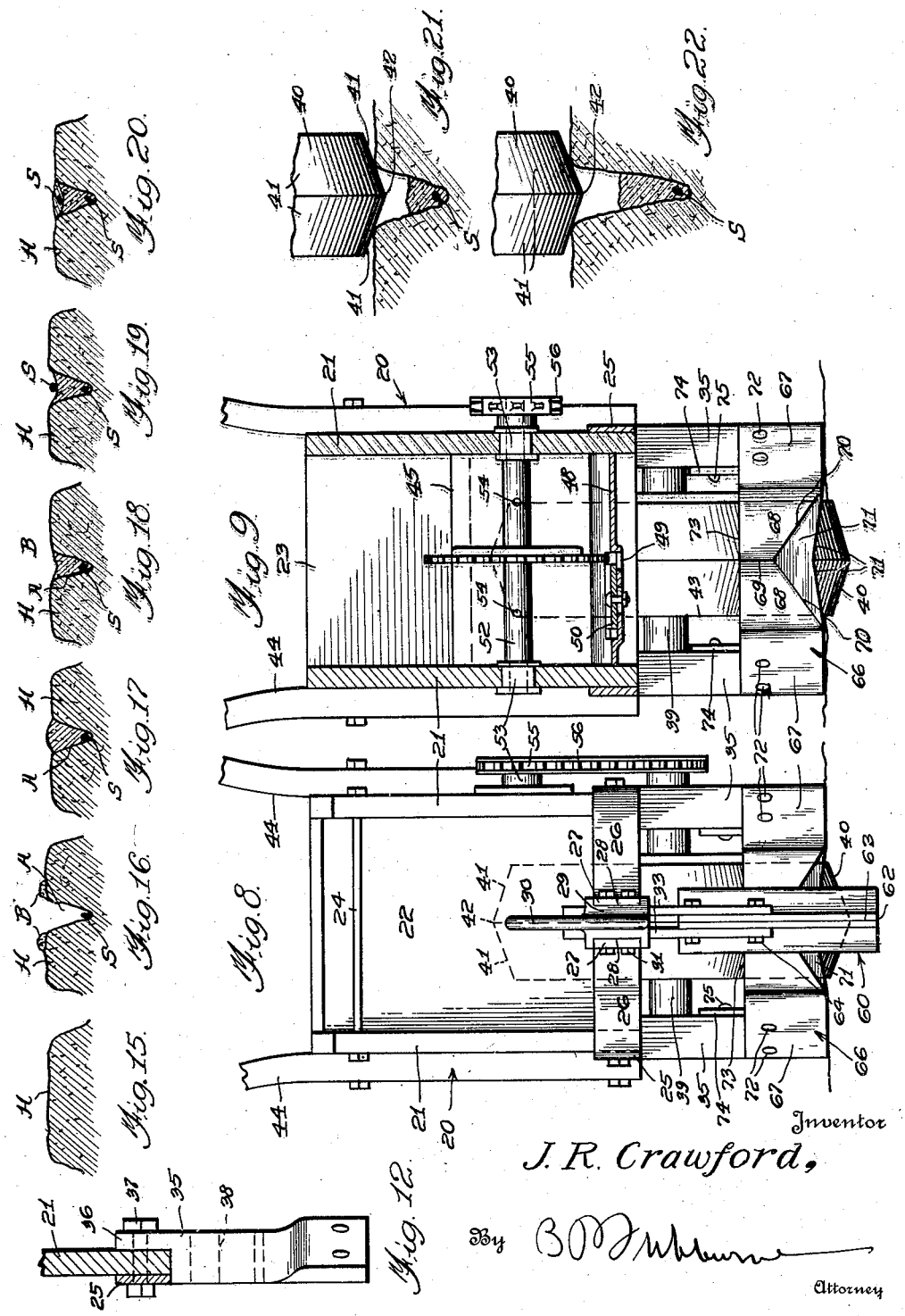
Inventor
J. R. Crawford,
By
Attorney Patented Jan. 14, 1930

1,743,882

UNITED STATES PATENT OFFICE

JAMES R. CRAWFORD, OF CLINTON, SOUTH CAROLINA, ASSIGNOR OF ONE-HALF TO C. REEDER WORKMAN, OF GOLDVILLE, SOUTH CAROLINA

TWO-DEPTH COTTON PLANTER

Application filed April 28, 1927. Serial No. 187,331.

My invention relates to planters adapted for depositing grain at a plurality of depths, and has particular reference to such apparatus which is well adapted to planting for cotton seed, while not necessarily restricted to this use.

As is well known, if cotton seed is planted at the usual or average depth, and a dry spell is encountered, the seed may not sprout in whole or in part. If the depth at which the seed is planted is increased, the sprouting under dry conditions is materially aided or increased, but if the ground should become unusually wet, the seed planted at the increased depth may rot in whole or in part. In order to meet the conditions which arise due to extreme dryness and extreme wetness of the soil, it has been proposed to plant cotton seed in rows at two elevations, whereby the planting will be favorable to either of the conditions.

I have provided a planter which is designed to plant cotton seed at two depths, for the reasons above explained. My planter is of simple construction and easily operated by the average farm laborer. The machine is so constructed that the depth of the furrow formed for receiving the seed to be deposited at the lower elevation, may be varied, without varying the depth at which the seed of the upper elevation is to be planted. This is accomplished by providing a ground wheel of substantially greater width than the front furrow opener, so that the ground wheel will travel upon the top of the hill, adjacent to the sides of the open furrow. The ground wheel has its periphery tapered or beveled so that the inner or central portion will project into the furrow, for a short distance, for producing the second furrow within which is deposited the seed to be planted at the higher elevation. As before stated, the ground wheel does not descend into the furrow for any considerable distance, and the weight of the machine is carried by this ground wheel. The machine may be turned upon the axis of the ground wheel for raising and lowering the front end of the same carrying the furrow opener, thereby regulating the depth of the furrow receiving the seed to be planted at the lower elevation. Means are provided to cover the upper furrow, and this means is self-adjusting, so that it remains in proper contact with the top of the hill, regardless of the vertical adjustment of the furrow opener. The ground wheel not only serves as a support for the machine, but functions as a furrow opener to produce the upper furrow.

A machine of this character may be readily worked in sandy soil, as frequently occurs in the State of South Carolina. When a red or clay soil is encountered, it is desired to make the lower furrow of a greater or increased depth, and this may be done by tilting the machine upon its transverse axis, as explained. However, in planting in the red or clay soil it is not desired to increase the depth of the upper furrow, and my machine may be manipulated to increase the depth of the lower furrow without increasing the depth of the upper furrow.

Other objects and advantages of the invention will be apparent during the course of the following description.

In the accompanying drawings, forming a part of this specification, and in which like numerals are employed to designate like parts throughout the same, Figure 1 is a side elevation of a planter embodying my invention, Figure 2 is a plan view of the same, Figure 3 is a plan view of the front furrow opener, viewed from line 3—3 of Figure 1, Figure 4 is a detailed section taken on line 4—4 of Figure 1, Figure 5 is a central vertical longitudinal section through the machine, Figure 6 is a detailed section taken on line 6—6 of Figure 2, Figure 7 is a bottom plan view of the machine, Figure 8 is a front end elevation of the same, Figure 9 is a transverse section taken on line 9—9 of Figure 1, Figure 10 is a fragmentary plan view of one of the rear covering elements or sweeps, Figure 11 is a bottom plan view of a modified form of front sweep, Figure 12 is an edge elevation of a bracket carrying the ground wheel, Figure 13 is a longitudinal section taken on line 13—13 of Figure 1, Figure 14 is a transverse section taken on line 14—14 of Figure 13, Figures 15 to 20, inclusive, are transverse sections through the hill, partly diagrammatic, illustrating the various steps taken by the machine in the planting operation, Figure 21 is a transverse section through the hill showing the ground wheel traveling over the furrow, and, Figure 22 is a similar view, showing the furrow of an increased depth.

In the drawings, wherein for the purpose of illustration, is shown a preferred embodiment of my invention, the numeral 20 designates the body portion of the planter as a whole, embodying sides 21, preferably formed of boards. Inclined ends 22 and 23 are disposed between the sides 21, and these parts are held or clamped together by transverse tie-bolts 24. This body portion is carried by a chassis, embodying metal bars or straps 25, arranged upon the outer faces of the sides 21 and rigidly held thereto by the lower tie-bolts 24. These metal straps extend forwardly beyond the bottom of the sides 20, see more particularly Figure 7, and are bent at a right angle, providing transverse extensions 26, carrying longitudinal extensions 27, arranged at a right angle to the extensions 26. These longitudinal extensions fit within longitudinal grooves 28, formed in the opposite sides of a block 29, carrying a forwardly projecting clevis 30, for connection with draft animals or the like. The extensions 27 are clamped within the grooves 28 by means of transverse bolts 31 or the like.

The numeral 32 designates a stock, embodying metal straps or bars 33 arranged in spaced parallel relation. The upper ends of these straps or bars 33 are adapted for insertion within vertical grooves 34, formed in the sides of the block 29 and arranged inwardly of the horizontal grooves 28. The bars 33 are adapted to have clamping engagement with the bar extensions 27, and hence, by manipulation of the bolts 31, the stock 32 may be vertically adjusted with respect to the body of the planter, and locked in adjustment at the selected elevation. The purpose of this adjustment will be explained later.

The numeral 35 designates a pair of vertical brackets, see Figure 12, provided at their tops with reduced extensions 36 engaging upon the inner faces of the sides 21, and held thereto and to the bars 25 by bolts 37. These brackets are provided in their upper portions with openings 38, rotatably receiving a transverse shaft 39, having a combined ground wheel and furrow opener 40, suitably rigidly secured thereon, for rotation therewith. The brackets 35 extend downwardly below the shaft 39 and are preferably made thinner and are twisted to assume an angular position, with respect to the axis of rotation of the ground wheel, as shown. The ground wheel has its periphery tapered or beveled in opposite directions, from a central point, whereby this periphery is somewhat V-shaped in cross section, affording inclined faces 41, and a point 42. The ground wheel 40 is preferably relatively wide and I have found that satisfactory results are obtained by making the ground wheel four inches in width, while the invention is not necessarily restricted to these precise dimensions. When the ground wheel 40 is four inches wide, its diameter at its center or point 42 will be sixteen inches, while the diameters at the sides 43 will be fourteen inches. This I have found affords a preferable inclination or bevel for the faces 41, while, of course, the invention is in no sense restricted to these precise dimensions. The ground wheel 40 performs several important functions in the operation of my machine. It serves to support the machine and to drive the seeding mechanism; aids in filling the lower furrow and packs the earth in the filled-in furrow; and produces the upper furrow on the top of this packed earth.

Secured to the rear ends of the body portion 20, through the medium of the tie-bolts 24, are handles 44.

Arranged above the ground wheel 40, between the sides 21 is a bridge 45, forming with the elements of the body portion, hoppers 46 and 47. The lower ends of these hoppers are covered by bottoms 48, see Figure 9, having longitudinal slots 49, for the passage of the seed, and the area of these slots may be regulated by adjustable slides or valves 50. Operating within the hoppers 46 and 47 are rotary agitators or wheels 51, suitably rigidly mounted upon transverse shafts 52, journaled in bearings 53, carried by the sides 21. The shafts 52 may also be provided with radial agitating fingers 54. The shafts 52 are provided exteriorly of the body portion 20, with sprocket wheels 55, engaged by a sprocket chain 56. This sprocket chain also passes about a sprocket wheel 57, rigidly secured to the shaft 39 of the ground wheel. The sprocket chain is engaged by a tension sprocket wheel 58, carried by a plate 59 adjustably mounted upon the side 21, as shown. The purpose of the wheel 58 is to properly take up the slack in the sprocket chain, as is obvious. It is thus seen that the rotation of the ground wheel will be imparted to the agitating elements or wheels 51, which in turn will effect a proper discharge of the seed in the hoppers, through the slots 49.

The numeral 60 designates a front furrow opener, as a whole, embodying wings 61, which diverge rearwardly, and increase in this rearward diverging upwardly. The lower ends of the wings 61 are straight, as shown at 62, and the forward edges of the wings converge so that they are arranged in parallel contacting relation, providing a front inclined edge 63, with the wings riveted together adjacent this edge. The upper portion of these front edges, thus contacting, are vertical, and these edges are positioned between the lower ends of the straps or bars 33. A bolt 64 passes through the lower ends of the bars 33 and the wings 63 and a breakable pin 65, preferably formed of wood or the like, passes through these parts above the bolt 64. In the event that the forward edge of the opener should encounter an obstruction in the soil, the breakable pin 65 would shear off, thus permitting the furrow opener 60 to turn upon the bolt 64 avoiding undue injury to the same. Of course, the invention is in no sense restricted to the use of the breakable pin.

The furrow opener 60 is arranged in advance of the ground wheel 40, as shown. The furrow opener 60 is much narrower throughout its lower portion which enters the soil and produces the furrow, than the ground wheel. The widest portion of the furrow opener, which enters the soil, may be two inches, as compared with a width of four inches at the periphery of the ground wheel. The purpose of having the furrow opener much narrower than the ground wheel is to enable the ground wheel to travel upon the top face of the hill over the furrow, with the point 42 of the ground wheel extending into the furrow for only a short distance, such as an inch, to produce the upper furrow.

Arranged at the rear of the furrow opener 60 is a sweep or leveling element 66, including a blade bent to form rearwardly diverging end portions 67, and forward portions 68, disposed at an angle to the portions 67 and meeting at a point 69. The blade as a whole is horizontally arranged and the forward converging portions 68 have their lower portions bent along inclined lines 70 producing inclined covering section 71 having slightly inclined edges 71'. The rear portions 67 of the blade are vertically adjustably attached to the lower ends of the brackets 35 by means of bolts 72 operating within elongated slots 72' formed in the portions 67, or the like. The upper edges 73 of the converging portions 68 converge forwardly and are substantially parallel with the faces 41 of the ground wheel, and are arranged in close relation to these faces, to remove dirt or the like adhering to the ground wheel.

As before stated, the periphery of the ground wheel packs the top of the filled furrow and produces the upper furrow in the same, and means are provided operating to the rear of the ground wheel for covering the upper furrow. This means comprises vertically swinging levers 74, which are pivoted at points arranged rearwardly of and near their forward ends, to the brackets 35, as shown at 75. Retractile coil springs 76 are secured to the forward ends of the levers 74, and chains 77 are attached to the upper ends of these coil springs and extend through openings 78 in the bridge 45, as shown in Figure 6. These chains may be longitudinally adjusted to regulate the tension of the springs 76, and locked in the adjusted positions by cotter pins 79 or the like, passed through selected links, as clearly illustrated in Figure 6. The levers 74 are capable of moving independently upon their pivots, as is obvious. At their rear ends, the levers 74 carry V-shaped sweeps 80, including rearwardly diverging blades 81, which are also twisted upon their longitudinal axes so that they diverge upwardly. The sweeps 80 are positioned rearwardly of the rear slot 49 so that the seed will be deposited in the furrow, while in advance of the same.

While it is preferred to employ the sweeps 66, for aiding in covering the lower furrow and also for scraping the ground wheel, yet I have found that satisfactory results may be obtained by dispensing with the sweep 66 and substituting therefor rearwardly diverging wings 66ª, Figure 11, carried by the brackets 35 and corresponding to the rear portions 67 of the sweep 66. These wings will serve to throw the soil from the furrow and level off the top of the hill. When the wings 66ª are employed, the ground wheel is relied upon to partly fill the lower furrow and to pack the same and produce the upper furrow.

When the planter is being used upon soil of generally the same characteristics, such as, upon a sandy soil, or upon a red or clay soil, the furrow opener 60 will be permanently adjusted. If the entire area of the soil is sandy, the furrow opener would be adjusted upwardly, while if the entire area of the soil is red or clay, the furrow opener would be adjusted permanently to a lower elevation. It frequently happens that the major portion of the soil will be sandy, with portions or spots of red or clay formation. In a case of this kind, the front furrow opener 60 is adjusted to the upper elevation, to suit the sandy soil. When the red or clay portion of the soil is reached, the furrow opener 60 is adjusted downwardly, by tilting the machine upon the shaft 39, so that the front end of the machine is lowered, and this may be effected while the machine is moving. The machine is driven downwardly of the hill H, Figure 15, and the ground wheel 40 travels on the top of the hill with its point 42 extending into the lower furrow A for a slight distance, such as, about an inch, while the furrow may be about three inches deep, as shown in Figures 16 to 21, inclusive. The seed from the front pocket or hopper 46 is being fed through the slot 49 and passes within and through the furrow opener 60 and is deposited at the bottom of the furrow A, as indicated at S, Figure 16. The furrow opener throws some of the earth upwardly beyond the upper surface or top of the hill, as shown at B', Figure 16, and a portion of this earth, particularly in the sandy soil, falls back into the furrow, and a portion of this earth is thrown back into the furrow by the forward portion 68 of the sweep 66, whereby the furrow is ordinarily filled, as indicated in Figure 17. The outer portions 67 of the sweep now carry the remainder of this soil outwardly from the furrow A, and cut down and level the hill, to some extent, as indicated in Figure 17. The ground wheel 40 traveling over the furrow may also aid in filling the furrow and packs the soil within the furrow and produces the upper furrow B, as indicated in Figure 18. The seed from the rear hopper or pocket 47 is next deposited in the upper furrow B, as indicated in Figure 19. The sweeps 80 following the deposited seed, tend to throw the earth at the top of the hill, both inwardly and outwardly, covering the seed in the upper furrow B, and further cutting down and leveling the top of the hill as indicated in Figure 20. These sweeps are thus shown as producing a flat top for the hill, which I have found to be advantageous. It may be desired to have the top of the hill convex or concave, in which event the blades of the sweeps 80 will have their rear ends bent downwardly or upwardly, respectively. During the travel of the machine longitudinally of the bed, the covering elements or sweeps 80 are maintained in constant contact with the top of the bed, and will fill the upper furrow with the same amount of earth, regardless of the tilting of the machine, to vary the depth of the lower furrow. The ground wheel at all times travels upon the top of the hill, and does not descend into the furrow even when it is made deeper, as shown in Figure 22.

It is to be understood that the form of my invention, herewith shown and described, is to be taken as a preferred example of the same, and that various changes in the shape, size and arrangement of parts may be resorted to without departing from the spirit of my invention, or the scope of the subjoined claims.

Having thus described my invention, I claim:

1. In a multiple depth seed planter, a support, a furrow opener secured to the support to produce a lower furrow, a ground wheel connected with the support to support the same and arranged rearwardly of the furrow opener, said wheel having a tread wider than that portion of the furrow opener which enters the soil and the furrow formed thereby and said tread being so shaped that the wheel travels upon the hill over the furrow, said tread having a part to form an upper furrow in the filled-in earth in the lower furrow, said tread having its lowermost point arranged at a substantial elevation above the lower end of the furrow opener, the support being adapted to be tilted upon an axis extending transversely of the same to raise or lower the furrow opener, seeding means to feed seed to the furrows, and means to cover the upper furrow.

2. In a multiple depth seed planter, a support, a furrow opener secured to the support to produce a lower furrow, a ground wheel connected with the support to support the same and arranged rearwardly of the furrow opener, said wheel having a tread wider than the earth engaging portion of the furrow opener and furrow, produced thereby, said tread being so shaped that the wheel travels upon the hill over the furrow, without bodily sinking into the furrow; said tread having a part to form an upper furrow, said tread having its lowermost point arranged at a substantial elevation above the lower end of said furrow opener, in the filled in earth in the lower furrow, the support being free from supporting means in advance of the ground wheel and adapted to be tilted about an axis extending transversely of the same to raise or lower the first named furrow opener, seeding means to feed seed to said furrows, and means for covering the upper furrow, said covering means being substantially independent in operation of the tilting action of said support.

3. In a multiple depth seed planter, a support, a furrow opener secured to the support to produce a lower furrow, a ground wheel connected with the support and arranged rearwardly of the furrow opener, said wheel having a tread wider than the earth engaging part of the furrow opener, said tread being inclined inwardly from substantially its center to the opposite sides thereof whereby it is adapted to feed earth into the furrow and to produce an upper furrow, said tread being of such a shape that it will travel upon the top of the hill, over the furrow without the wheel sinking bodily into the bottom of the furrow, said tread having its lowermost point arranged at an elevation a substantial distance above the lower end of the furrow opener, in the filled in earth of the lower furrow, means to feed seed to the furrows, and means connected with the support to cover the upper furrow, said support being free from supporting means in advance of the ground wheel whereby it may be tilted longitudinally upon the axis of the ground wheel for raising and lowering the furrow opener.

4. In a multiple depth seed planter, a support, a furrow opener secured to the support to produce a lower furrow, a ground wheel connected with the support and arranged rearwardly of the furrow opener, said wheel having a tread wider than the earth engaging part of the furrow opener and the furrow produced thereby, said tread being so shaped that the wheel is adapted to travel upon the hill over the furrow without sinking bodily into the bottom of the furrow, said tread having a part to produce an upper furrow in the filled-in earth of the lower furrow said tread having its lowermost point arranged at a substantial elevation above the lower end of the furrow opener, a sweep connected with the support and arranged between the furrow opener and wheel to feed earth into the lower furrow, said sweep also serving to remove earth adhering to said wheel, seeding means to supply seed to the upper and lower furrows, and covering means for the upper furrow, said support being free of connecting means in advance of the ground wheel whereby the support may be tilted longitudinally upon the axis of the ground wheel.

5. In a multiple depth seed planter, a support, a furrow opener secured to the support to produce a lower furrow, a ground wheel connected with the support and arranged rearwardly of the furrow opener, said wheel having a tread wider than the earth engaging part of the furrow opener, said tread having a part to produce an upper furrow in the filled-in earth of the lower furrow, said tread being so shaped that it will travel upon the hill over the furrow without said wheel descending bodily into the bottom of the furrow, said tread having its lowermost point arranged at an elevation above the lower end of said furrow opener, a sweep connected with the support and arranged between the furrow opener and wheel to feed earth into the lower furrow, seeding means to supply seed to said furrows, and means to cover the upper furrow, said support being free from supporting means in advance of the ground wheel whereby the support may be tilted longitudinally upon the axis of the ground wheel for raising and lowering the furrow opener.

6. In a multiple depth seed planter, a support, a furrow opener secured to the support to produce a lower furrow, a ground wheel connected with the support rearwardly of the furrow opener, said wheel having a tread wider than the earth engaging part of the furrow opener, said tread having a part to produce an upper furrow in the filled-in earth of the lower furrow, a sweep connected with the support rearwardly of the furrow opener, said sweep having an inner part to feed earth into the lower furrow and an outer part to feed earth from the furrow, seeding means to supply seed to said furrows, and means to cover the upper furrow.

7. In a multiple depth seed planter, a support, a furrow opener connected therewith to produce a lower furrow, a ground wheel connected with the support rearwardly of the furrow opener and having a tread wider than the ground engaging part of the furrow opener, said tread having a part to form a furrows in the filled-in earth of the lower furrow, said support being adapted to be longitudinally tilted with relation to the ground wheel to raise and lower the furrow opener, means to feed seed to the upper and lower furrows, a lever pivotally connected with the support and carrying a sweep operating rearwardly of the ground wheel to cover the upper furrow, and a spring to move the lever in one direction to retain the sweep in engagement with the ground.

8. In a multiple depth seed planter, a support, a furrow opener connected therewith to produce a lower furrow, a ground wheel connected with the support rearwardly of the furrow opener and having a tread provided with a part to produce an upper furrow in the filled-in earth of the lower furrow, means to feed seed to the upper and lower furrows, levers pivoted to the support for independent action and carrying sweeps operating rearwardly of the ground wheel and adapted to shift the soil laterally and inwardly to cover the upper furrow, a spring connected with each lever to move the same in one direction, and adjustable means to regulate the tension of the spring.

9. In a multiple depth seed planter, a support, a furrow opener connected therewith to produce a lower furrow, means connected with the support rearwardly of the furrow opener to fill the lower furrow and produce an upper furrow in the filled-in earth of the lower furrow, means to feed seed to the upper and lower furrows, pivoted elements carried by the support, and sweeps carried by the pivoted elements, each sweep embodying a pair of rearwardly diverging blades which are twisted longitudinally so that they diverge upwardly, said sweeps being adapted to feed the soil laterally toward and from the upper furrow.

In testimony whereof I affix my signature.

JAMES R. CRAWFORD.